US005895452A

United States Patent [19]

Lum

[11] Patent Number: 5,895,452
[45] Date of Patent: Apr. 20, 1999

[54] POINT-OF-SALE SYSTEM

[75] Inventor: Jackson Lum, Roslyn, N.Y.

[73] Assignee: Logic Controls, Inc., New Hyde Park, N.Y.

[21] Appl. No.: 08/899,290

[22] Filed: Jul. 23, 1997

Related U.S. Application Data

[63] Continuation of application No. 08/350,587, Dec. 6, 1994, which is a continuation of application No. 08/011,461, Jan. 2, 1993.

[51] Int. Cl.$^6$ .................... G06F 9/06; G06F 5/04
[52] U.S. Cl. .................... 705/16; 395/200.33
[58] Field of Search .................... 705/21, 20, 16, 705/23–25; 340/825.51–825.52; 235/7 R, 12; 364/132, 138, 140.02, 140.07; 395/200.31–200.33, 200.38–200.43, 200.55, 200.6, 200.68, 871, 868, 800.51

[56] References Cited

U.S. PATENT DOCUMENTS

| | | |
|---|---|---|
| T948,012 | 7/1976 | Bouknecht et al. . |
| 3,898,373 | 8/1975 | Walsh . |
| 4,181,936 | 1/1980 | Kober . |
| 4,304,001 | 12/1981 | Cope . |
| 4,387,425 | 6/1983 | El-Gohary . |
| 4,443,866 | 4/1984 | Burgiss, Sr. . |
| 4,484,273 | 11/1984 | Stiffler et al. . |
| 4,516,201 | 5/1985 | Warren et al. . |
| 4,547,850 | 10/1985 | Genma . |
| 4,626,844 | 12/1986 | Mann et al. . |
| 4,641,266 | 2/1987 | Walsh . |
| 4,688,171 | 8/1987 | Selim et al. . |
| 4,742,484 | 5/1988 | Yanai et al. . |
| 4,817,037 | 3/1989 | Hoffman et al. . |
| 4,852,043 | 7/1989 | Guest . |
| 4,862,353 | 8/1989 | Williams . |
| 4,935,720 | 6/1990 | Kalfoun . |
| 4,972,463 | 11/1990 | Danielson et al. . |
| 5,018,066 | 5/1991 | Yagi . |
| 5,119,294 | 6/1992 | Tanaka . |
| 5,128,862 | 7/1992 | Mueller . |
| 5,165,024 | 11/1992 | Sweazey . |
| 5,179,375 | 1/1993 | Dick et al. .................... 340/825.51 |
| 5,218,527 | 6/1993 | Ishikawa et al. . |
| 5,235,509 | 8/1993 | Mueller et al. . |
| 5,313,664 | 5/1994 | Sugiyama et al. . |
| 5,371,859 | 12/1994 | Lennartsson . |
| 5,410,650 | 4/1995 | Sasaki et al. . |
| 5,438,607 | 8/1995 | Przygoda, Jr. et al. . |
| 5,444,847 | 8/1995 | Iitsuka . |
| 5,446,846 | 8/1995 | Lennartsson . |
| 5,510,979 | 4/1996 | Moderi et al. . |
| 5,535,336 | 7/1996 | Smith et al. . |

*Primary Examiner*—Frantzy Poinvil
*Attorney, Agent, or Firm*—Hoffmann & Baron, LLP

[57] ABSTRACT

A point-of-sale system freely configurable with a plurality of peripheral input devices. The system includes a general purpose computer with an input port for receiving data. An electronic interface is coupled to the input port and readily connectable to the plurality of peripheral input devices for transmitting data from the plurality of peripheral input devices to the computer input port. The plurality of peripheral input devices can be selectively connected and disconnected from the electronic interface, the electronic interface maintaining a continuous dialogue with the computer during the connection and disconnection of the plurality of input devices.

19 Claims, 5 Drawing Sheets

POINT-OF-SALE SYSTEM

CROSS-REFERENCE TO RELATED DOCUMENTS

This is a continuation of copending application Ser. No. 08/350,587 filed on Dec. 6, 1994, which is a file wrapper continuation of application Ser. No. 08/011,461 filed on Jan. 2, 1993.

A Disclosure Document has been filed with the U.S. Patent & Trademark Office relating to this invention on Oct. 1, 1992 and was given document number 318662.

BACKGROUND OF INVENTION

1. Field of the Invention

The present invention relates to an apparatus for a Point-of-Sale (POS) system where the peripheral input devices are connected to the computer keyboard input port of a standard personal computer.

More specifically, the present invention relates to an improved Point of Sale system utilizing a standard computer and wherein all peripheral input devices are connected in a daisy-chain configuration and can be easily inserted or removed from the system.

2. The Prior Art

In the past, most point-of-sale systems were integrated or "closed" systems where the failure of any one element would require the entire system to be shut down for replacement of the defective element or in the more serious case, the entire system would need to be replaced. These "closed" systems utilize input devices similar to those of the present invention. Typical peripheral input devices are bar code readers, credit card readers, i.e. magnetic stripe readers, POS keypads, electronic scales, etc. Moreover, these computers and peripheral devices were designed as dedicated systems so that generic, off the shelf components could not be utilized as replacements.

In general, different input devices have different interface requirements. Thus input device #1 may be directly connected to the computer keyboard port while input device #2 may require an interface box to convert its built-in output format to RS232 data format. Other input devices may require an internal interface card to convert their built-in output format to a data format that is comparable with the computer. The major problems associated with this type of traditional interface are: 1) Each input device requires a hardware interface card or box; and, 2) Each input device requires a software identification number and interrupt number for the computer to address and communicate with the device. As a result, higher hardware costs and more physical space is required as each input device is added to the system. In addition, the added software requirement for each input device requires software changes to be made every time an input device is changed.

In addition to the above mentioned short falls of the "closed" system, should a particular input device become outdated or obsolete, the entire system will require changing in order to support the new input device. Thus, updating "closed" systems is wasteful, impractical and uneconomical. Moreover, updating closed systems often causes useful and operating components of the system to be replaced when they are still functional but can only be used with the integrated system.

Accordingly, the disadvantages of closed point-of-sale systems are overcome by connecting all input devices in a daisy chain configuration, to the keyboard input port of the computer. Each input device has a built-in keyboard emulation, commonly known as a wedge interface. Each of these devices can be used singly with the computer, or with other input devices. Since all input data appear to the computer as keyboard data, no software changes are required, as input devices are added or deleted. The advantage of this configuration is that no special or customized hardware and software drivers are needed. Only the standard keyboard drivers that are included in every computer are required. Thus, the components of the system of the present invention can be easily updated or removed from the system without disturbing the other components of the system.

SUMMARY OF THE INVENTION

It is therefore an object of the present invention to provide an efficient and flexible Point-of-Sale system, which allows peripheral input devices to be freely inserted or removed from the system.

It is a further object of the present invention to provide a Point-of-Sale system which allows all input devices to be connected in a daisy chain configuration to the computer keyboard input port of a general purpose computer.

It is another object of the present invention is to provide a Point-of-Sale system which utilizes an active electronic interface cable for coupling the input devices to the keyboard input port.

It is yet another object of the present invention to provide a Point-of-Sale system whereby input devices such as bar code readers, credit card readers, POS keyboards, electronic scales, etc. can be inserted or removed from the system easily without requiring modification of the software or hardware drivers.

It is still a further object of the present invention to provide a Point-of-Sale system where the failure of one or more input devices will not impede the operation of the system or other input devices.

These and other related objects are achieved according to the invention by a Point-of-Sale system which uses an electronic interface for coupling the input devices to the computer through the keyboard input port. The active interface cable serves as a replacement for conventional interfacing means used for the input devices. The input devices are connected, via the interface cable or wedge, in a daisy chain configuration, thus allowing the removal and or addition of an input device without requiring any changes to the hardware or software needed to run the system. The wedge interface allows more than one peripheral to be connected to the keyboard input port which ordinarily is coupled to a keyboard only.

The Point-of-Sale system according to the invention is freely configurable with a plurality of peripheral input devices. The system includes a general purpose computer with an input port for receiving data and an electronic interface means coupled to the input port and readily connectable to the plurality of peripheral input devices. The electronic interface means transmits data from the peripheral input devices to the computer input port. The plurality of peripheral input devices can be selectively connected and disconnected from the electronic interface means. The electronic interface means maintains a continuous dialogue with the computer during the connection and disconnection of the plurality of input devices.

Other objects and features of the present invention will become apparent from the following detailed description considered in connection with the accompanying drawings. It is to be understood, however, that the drawings are designed as an illustration only, and not as a definition of the limits of the invention.

BRIEF DESCRIPTION OF DRAWINGS

In the drawings, wherein similar reference characters denote similar elements throughout the several views.

DETAILED DESCRIPTION OF THE PREFERRED EMBODIMENT

Figure 1:
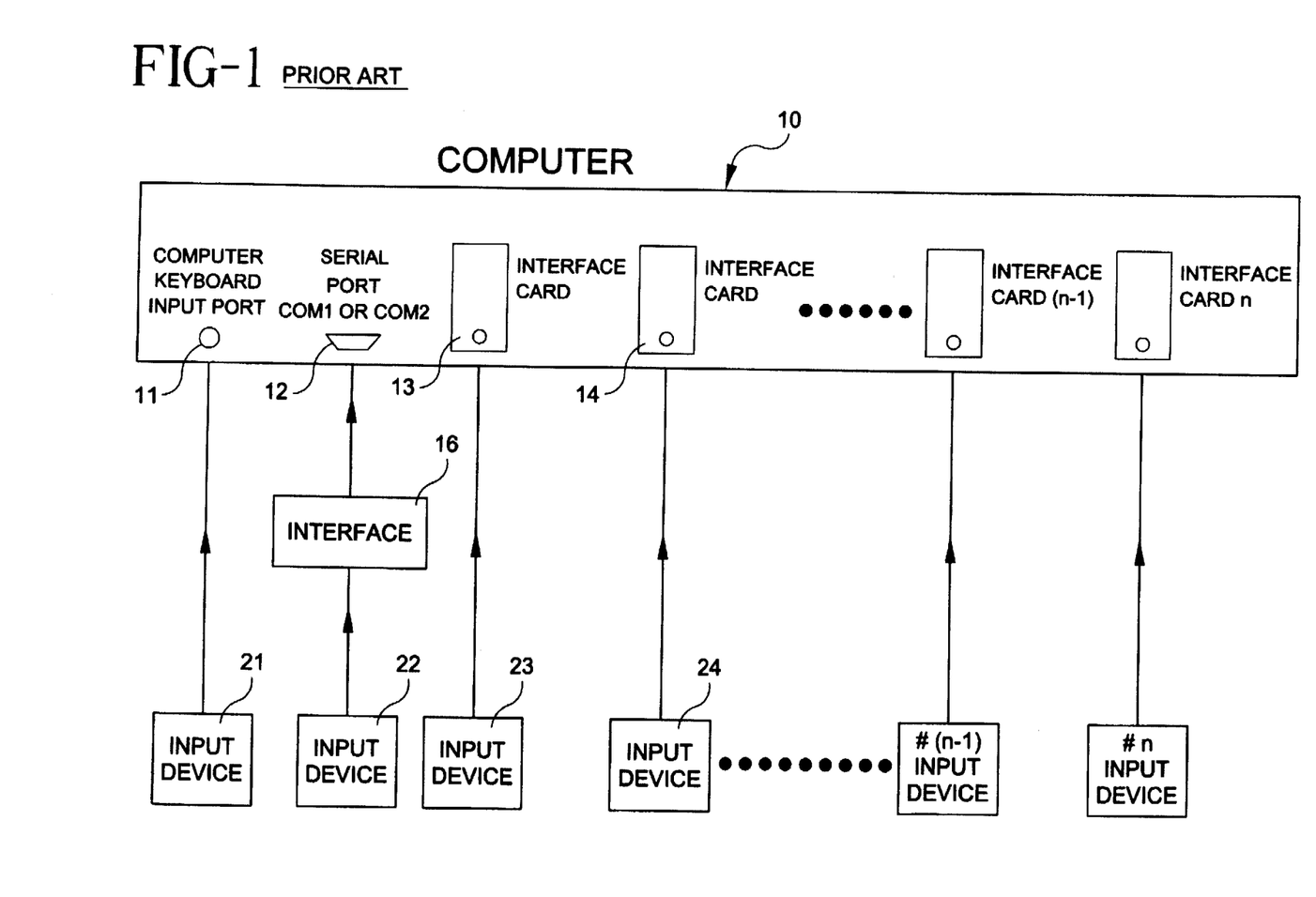
FIG. 1 is a block diagram of a prior art Point-of-Sale system.

Referring now in detail to the figures, and in particular FIG. 1, there is shown a prior art point-of-sale system having a general purpose computer 10 with a plurality of input devices/peripherals 21, 22, 23 . . . . , n-1 and n connected to computer 10. Input device 21, for example, a standard keyboard, is connected to computer 10 through the computer keyboard input port 11. Input device 22 is connected to the serial port 12 of computer 10. A separate interface 16 is required for input device 22 to communicate with computer 10. Input devices 23 and 24 interface with computer 10 by means of internal interface card 13 and 14 respectively. Additional input devices would require their own separate interface cards. Thus each input device requires a different interface with computer 10. Furthermore, the number of input devices is limited by the number of slots available on computer 10 to receive interface cards. In addition, adding or removing internal interface cards requires partial disassembly of computer 10, reconfiguration of the software, and re-booting the system. These prior art systems are known as "closed" systems since peripherals cannot be readily integrated or removed from the system.

Figure 2:
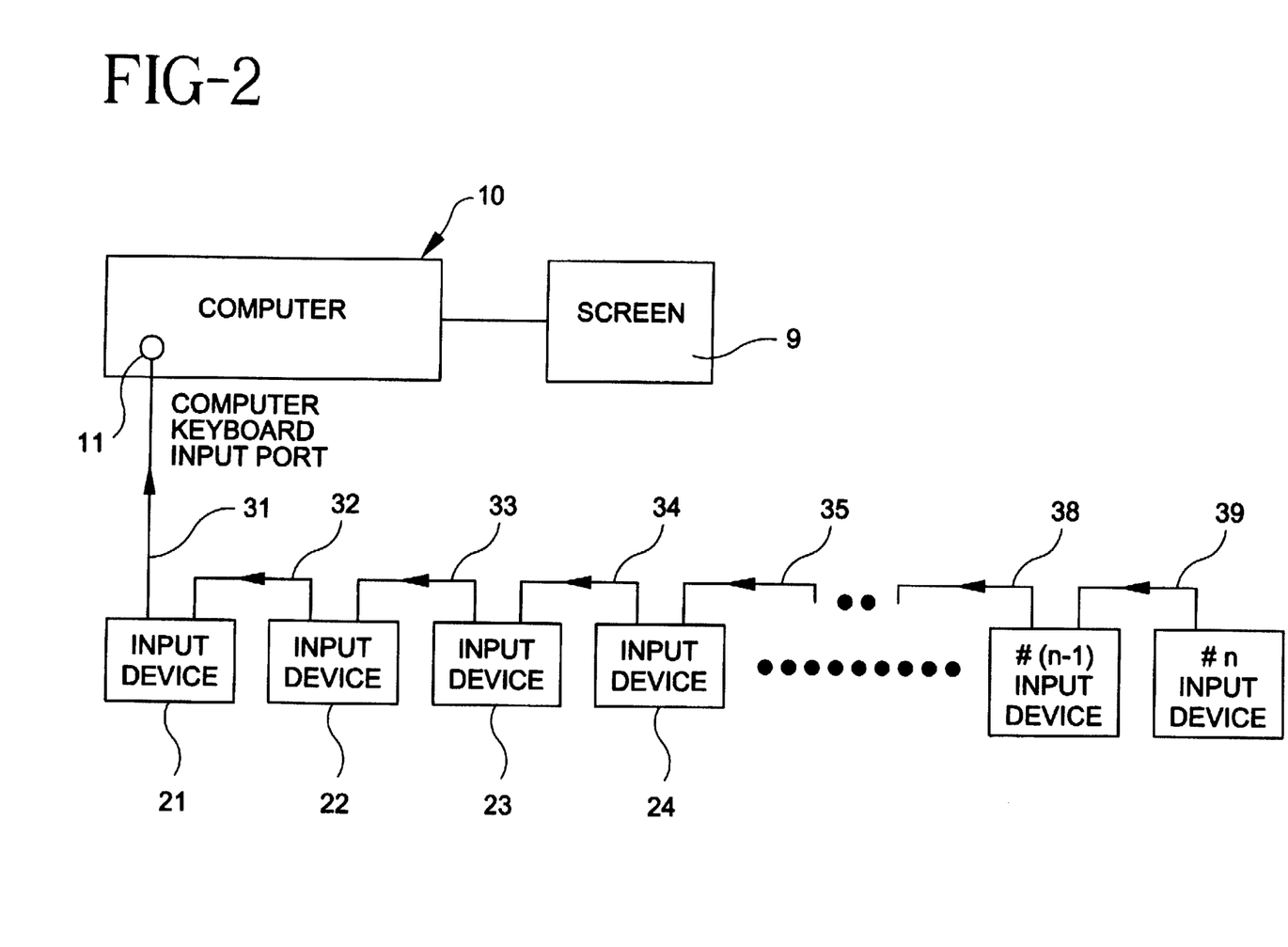
FIG. 2 is a block diagram of a Point-of-Sale system according to the invention.

Referring to FIG. 2, there is shown a point-of-sale system with a screen 9, according to the invention, wherein input devices 21, 22, 23, 24 . . . . , n-1 and n are connected in a daisy chain configuration to each other by means of cables 31–35 . . . 38 and 39. Cable 31 couples input devices 21–n to computer 10 via the computer keyboard input port 11. The input devices can be freely integrated or removed from the system by coupling or uncoupling their respective cables.

Most of the input devices provide a pass-through connection which allows other input devices to communicate directly with computer 10. For example, while input device 23 is communicating with computer 10, input devices 21 and 22 are passive with the signal from input device 23 simply by-passing input devices 21 and 22. If input device 22 has data to be sent to computer 10, it will monitor the pass-through communication on lines 33 and 32 and wait for a break. Input device 22 would then electrically disconnect line 33 (thus disabling input devices 23–n) and would transmit its data along cable 32. While input device 22 is communicating with computer 10, input device 21 maintains the pass-through connection, i.e. an internal electrical coupling of cables 31 and 32.

Once input; device 22 has completed transmitting its data, it would electrically re-connect cables 32 and 33, bringing input devices 23–n back on line and allowing any of the input devices to transmit data to computer 10. It should be noted that damage or failure to any of the input devices would not necessarily cause a system crash. For example, if input device 23 malfunctioned, as long as the pass-through connections of cables 33 and 34 was intact, the remaining input devices could function normally.

Figure 3:
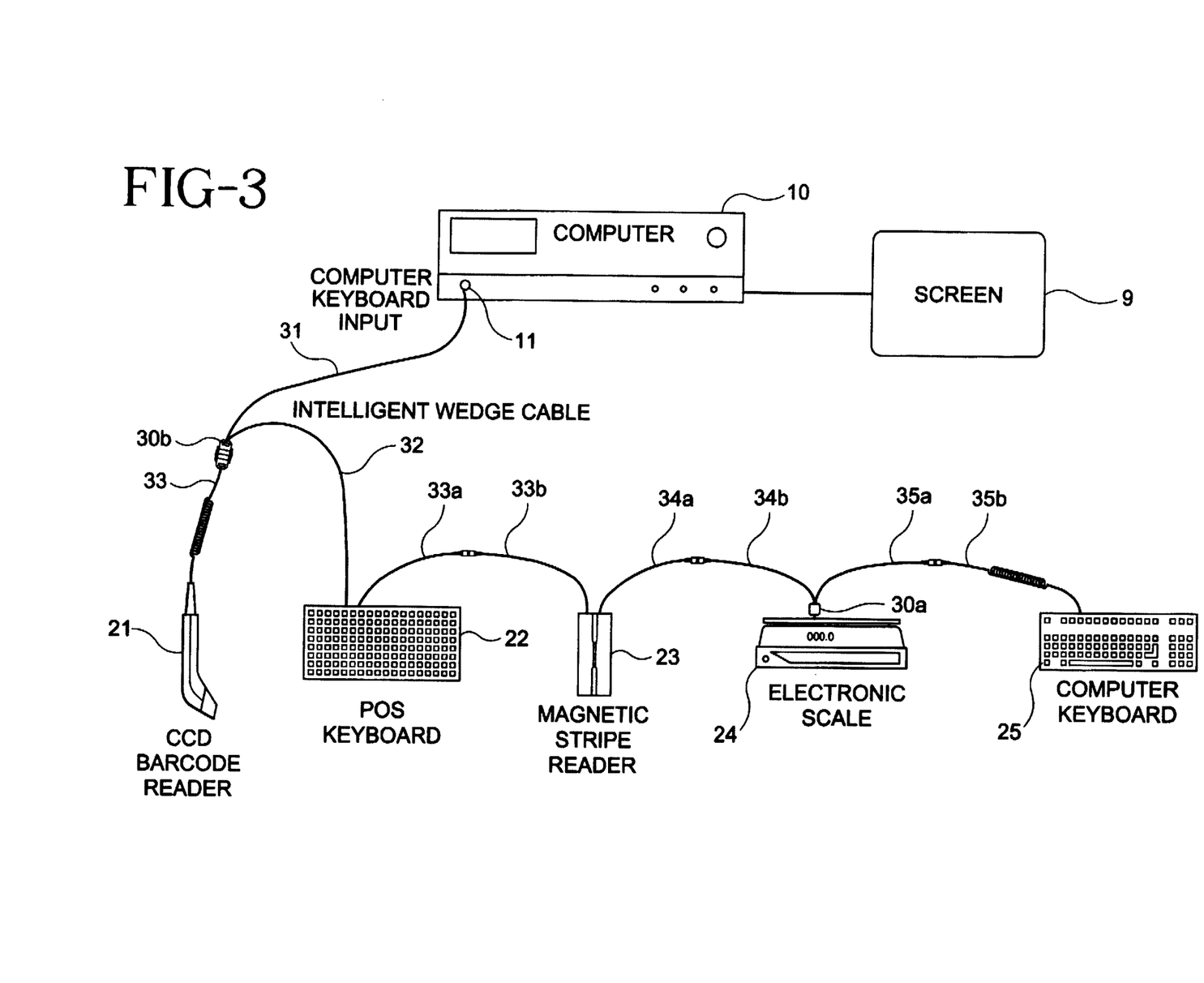
FIG. 3 is a diagram of the Point-of-Sale system with specific input devices.

FIG. 3 shows an actual point-of-sale system according to the invention with a screen 9 and specific input devices connected in a daisy chain configuration to keyboard input port 11. The system includes a point-of-sale program executable by computer 10. Computer keyboard 25 is connected by cable 35a,b to electronic scale 24 which is equipped with an interface 30a. Electronic scale 24 is then connected by cable 34a,b to magnetic stripe reader 23. Magnetic stripe reader 23 is connected to POS keyboard 22 also by means of a cable 33a,b. The CCD bar code reader 21 is connected to the POS keyboard 22 through cable 33, an interface 30b and cable 32. Interface 30b is connected to keyboard input port 11 through cable 31. The point-of-sale program includes a programmable look-up table corresponding to POS keyboard 22 for correlating the keys on POS keyboard 22 to a particular item and its price.

Since input devices 21-25 are connected to keyboard input port 11, each input device must transmit data in the standard keyboard format to be understood by computer 10 which expects standard keyboard formatted data through keyboard port 11. POS keyboard 22 and magnetic stripe reader 23 and computer keyboard 25, for example, have a built-in wedge interface. Bar code reader 21 and electronic scale 24, for example, have different output formats, i.e. RS232 data format or OCIA format, which are converted to standard keyboard format by interface 30a or 30b. Therefore, all input devices send standard keyboard formatted data to keyboard input port 11.

An important advantage of the point-of-sale system shown in FIG. 3 is the overlap of various input functions, i.e. redundancy of functions. POS keypad 22, for example, contains a full alphanumeric keyset (i.e. A–Z and 0–9) such that it can perform the same functions as computer keyboard 25. Therefore if POS keypad 22 or keyboard 25 failed, the other keypad or keyboard could still be used to enter information. Each key of POS keypad 22 may represent a string of up to 15 characters and is fully programmable. Furthermore, if magnetic stripe reader 23 failed, the credit card information could be alternately fed to computer 10 through POS keypad 22 or computer keyboard 25. If CCD bar code reader 21 failed, the numerical representation of the bar code data could be entered through POS keypad 22 or computer keyboard 25.

Due to these redundant functions, failure of a component need not interrupt the processing of a given customer. If magnetic stripe reader 23 failed while trying to read credit card data, the information could simply be entered on POS keypad 22 while a new magnetic stripe reader is exchanged for the defective magnetic stripe reader.

A further advantage of the point-of-sale system is that a basic system, e.g. a computer, computer keyboard and point-of-sale software could be purchased initially. A bar code reader, POS keypad, magnetic stripe reader and/or electronic scale could then be purchased and added to the system at a later date as the user's needs expanded. Adding additional peripherals would not require a reconfiguration of software or hardware, they could simply be plugged in. It should also be noted that POS keypad 22, magnetic stripe reader 23 or electronic scale 24 could be connected directly to keyboard input board 11, i.e. through cables 32, 33b and 34b respectively.

Figure 4:
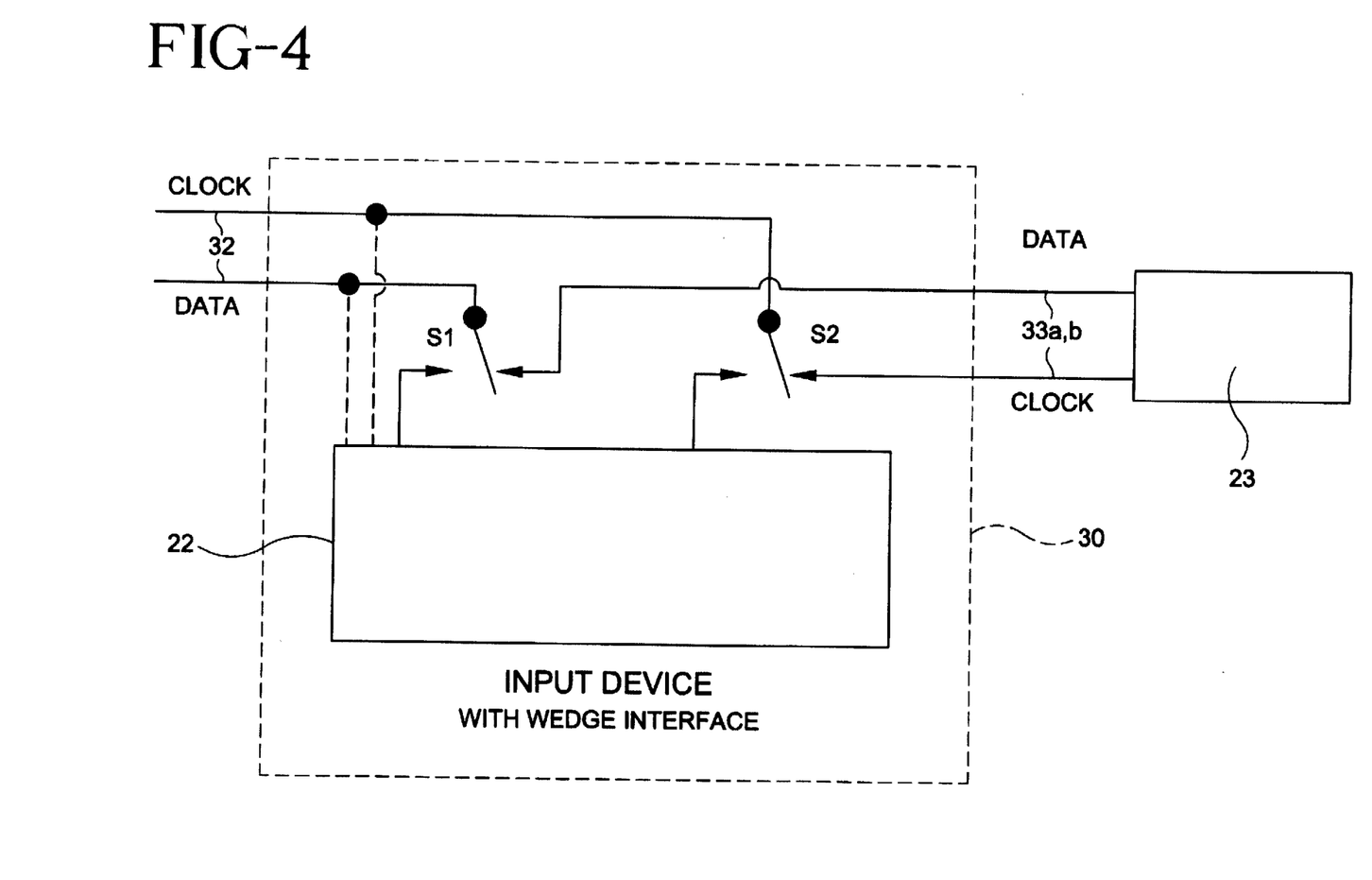
FIG. 4 is a block diagram of an input device with an interface.

FIG. 4 shows the basic structure of an internal interface 30 built into POS keypad 22, for example. Interface 30 is coupled to magnetic stripe reader 23 via cables 33a, 33b and to other peripherals via cable 32. In normal operation, S1 and S2 of interface 30 are switched over to the right, as shown in FIG. 4, providing magnetic stripe reader 23, electronic scale 24 and keyboard 25 with a pass-through connection. Input devices 23, 24 and 25 can then communicate with computer 10 as if POS keyboard 22 were not present. Before POS keyboard 22 transmits data, interface 30 first checks the availability of the clock and data lines for transmission, thus avoiding possible bus contention. If the lines are free, S1 and S2 switch over to the left, disconnecting input device 23 and others connected to input device 23 and allowing POS keyboard 22 to transmit clock and data information to computer 10. When the lines are busy, interface 30 will store the data from the input device until the lines are free. Once the lines are free, switches S1 and S2 are switched over to allow data from the input device to be transmitted to computer 10. If multiple interfaces are present, they will independently store and monitor the lines until the lines are free and then transmit their stored data.

Interface 30 converts the data it receives from the input device, for example, RS232 or OCIA format, into keyboard type data so that computer 10 only receives data in standard keybardforat regardless of the source of the information. As can be seen in FIG. 3, bar code reader 21 and scale 24 are both equipped with external interfaces 30a and 30b, to convert their output into standard keyboard format. In addition, interface 30 permits a peripheral having a single output jack to be connected serially to other peripherals. Also, interface 30 can be used to convert all data to RS232 format or any other format. Thus, all input devices could be daisy-chained together and connected to an internal card in the back of computer 10.

When interface 30 is not transmitting clock and data to computer 10, it monitors and records all activities between keyboard 25 and computer 10. For example, if the Caps Lock key is pressed, interface 30 will make the proper case inversion such that the computer always receives the correct characters from the input device. The similar monitoring logic also allows the wedge interface to identify and adapt to the type of computer used in the system, e.g. XT, AT, PS/2 model 25 or models 50–90 and compatibles thereof. Interface 30 maintains a continuous dialogue with the computer if the standard keyboard is absent. Therefore, the computer can boot up properly without "Keyboard Error" even if the standard keyboard and/or input devices are not installed. In other words, interface 30 will communicate with computer 10 allowing the peripherals to be inserted or removed from the system. If a peripheral is present and has data to be transmitted to computer 10, interface 30 will cease communication with computer 10 and allow data to pass from the peripheral through interface 30 to computer 10.

As can be seen in FIG. 3, any input device, for example magnetic stripe reader 23, can be removed from the system by uncoupling cable 33a from cable 33b and uncoupling cable 34a from cable 34b. Cable 33a is then coupled to cable 34b. While the cables are uncoupled bar code reader 21 and POS keypad 22 are still operating. Thus, failed components can be replaced in a system with minimum downtime or while other components, still coupled to the computer, continue to function. If all peripherals were removed, interface 30 connected by cable 30 to keyboard input 11 would continue to communicate with computer 10 avoiding a "keyboard error". Additional peripherals could be coupled to interface 30 at any time thereafter.

Figure 5:
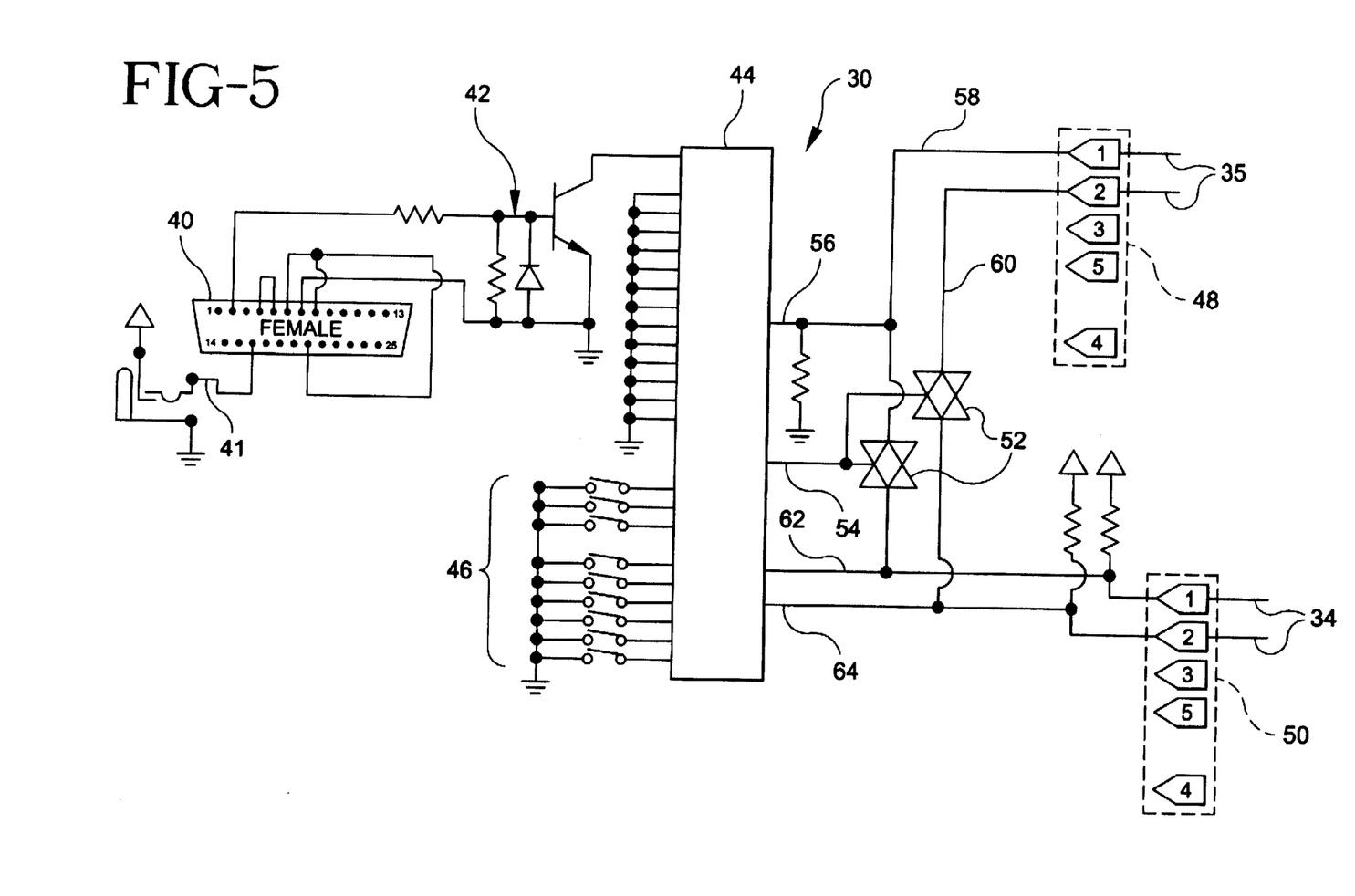
FIG. 5 is a detailed schematic of the interface.

FIG. 5 is a detailed drawing of interface 30 having a 25-pin female jack 40, for connecting to the output of a peripheral device. The signal from the peripheral device is then inverted by circuit 42 and transmitted to microprocessor 44, for example, an 80C51 micro controller. Interface 30 may optionally be powered by a 5 V power supply to pin 16 on power line 41. A bank of parameter switches or dip switches 46, allows the adjustment of baud rate (between 150 and 19,200), parity option (on or off), number of data bits (7 or 8) output, num-lock capability and an auto-discriminate feature that automatically discerns the type of computer attached or allows a default to AT-type.

Interface 30 includes a keyboard input 48 which is a DIN 5-pin or 6-pin connector. Cable 35 from keyboard 25 is coupled to keyboard input 48. Interface 30 also includes an interface output 50, for example, a DIN 5-pin connector. Cables 34 are coupled to interface output 50. Switches 52 are provided between keyboard input 48 and interface output 50 and are simultaneously controlled by switch control line 54. Microprocessor 44 monitors clock line 58 through monitor line 56. Clock line 58 and data line 60 are connected to microprocessor clock line 62 and microprocessor data line 64.

Ordinarily, switch control line 54 holds switches 52 closed directly coupling keyboard input 48 with interface output 50. When the peripheral device coupled to 25-pin jack 40 has information to be transmitted to computer 10, the information is inverted by circuit 42 and stored in microprocessor 44. Monitor line 56 monitors clock line 58 and when clock line 58 is free, microprocessor 44 directs switch control line 54 to open switches 52. The stored data is then transmitted along microprocessor clock line 62 and microprocessor data line 64 to interface output 50. Since computer 10 is always receiving information in standard keyboard format, it can not distinguish whether the information is coming from a keyboard or other peripheral. Thus, keyboard input 48 is coupled to a peripheral, for example keyboard 25, in a pass-through connection to interface output 50. A peripheral which has an output other than standard keyboard format is connected at jack 40.

It should be noted that any type of peripheral can be connected to microprocessor 44 by proper selection of the jack, conversion circuit and firmware for the microprocessor. In addition, once the peripheral outputs are converted to standard keyboard output, any number of peripherals can be strung together. When another peripheral is operating, the non-operating interfaces simply pass through the data without interference.

During normal operation, computer 10 is executing the POS application software, for example, a "check-out" program. During the "check-out" routine, computer 10 prompts the cashier for the SKU label of a piece of merchandise. As a response to the prompt, the cashier would normally scan the SKU label with the CCD bar code reader 21. Interface 30a then converts the CCD bar code reader output to standard keyboard format which computer 10 then accepts through its keyboard input port 11. Alternatively, the cashier may press a key on POS keypad 22, weigh an item on scale 24, or enter an SKU manually on keyboard 25. The output from input devices 22, 23, 24 or 25, would be converted to standard keyboard format by either an internal or external interface. The converted signal is then transmitted to keyboard input port 11.

When the POS software is prompting for payment, the cashier would enter the amount tendered by the customer through the computer keyboard 25 or the POS keypad 22.

Alternatively, if the customer wishes to pay by credit card, the POS software would prompt the cashier to read the customers credit card. Using magnetic stripe reader 23, computer 10 receives data through keyboard input port 11 and interprets the data as credit card information and processes it accordingly.

Thus, while only a single embodiment of the present invention has been shown and described, it is obvious that many changes and modifications may be made thereunto without departing from the spirit and scope of the invention.

What is claimed is:

1. An apparatus for serially connecting a plurality of peripheral input devices to an input port of a general purpose computer, said apparatus having an interface comprising:

an interface input and an interface output, said interface output being operatively connected to the input port of the computer and said interface input being operatively connected to a first peripheral input device;

a peripheral device port operatively connecting a second peripheral input device to said interface;

a microprocessor operatively connected to said interface input, said microprocessor monitoring data communications between the computer and said first peripheral input device, said microprocessor generating a signal having a first value indicative of the occurrence of said data communications between said computer and said first peripheral input device, said signal having a second value indicative of the computer being available for data communication with said second peripheral input device; and, a multiplexer operatively connected between said interface input and said interface output, and selectively providing an electrical connection between said interface input, said interface output and said peripheral device port, said multiplexer having a control input operatively connected to said microprocessor and being responsive to said signal from the microprocessor, said multiplexer performing one of the following functions:
    (i) when said signal is at said first value, directing data received from said interface input to said interface output; and,
    (ii) when said signal is at said second value, directing data received from said peripheral device port to said interface output.

2. An apparatus according to claim 1, further including a second interface comprising:

an interface input and an interface output, said interface output being operatively coupled to the interface input of said interface, and said interface input being operatively connected to said first peripheral input device;

a peripheral device port operatively connecting a third peripheral input device to said second interface;

a microprocessor operatively connected to said interface input, said microprocessor monitoring data communications between the computer and said first peripheral input device, said microprocessor generating a signal having a first value indicative of the occurrence of said data communications between said computer and said first peripheral input device, said signal having a second value indicative of the computer being available for data communication with said third peripheral input device; and, a multiplexer operatively connected between said interface input and said interface output, and selectively providing an electrical connection between said interface input, said interface output and said peripheral device port, said multiplexer having a control input operatively connected to said microprocessor and being responsive to said signal from the microprocessor, said multiplexer performing one of the following functions:
    (i) when said control signal is at said first value, directing data received from said interface input to said interface output; and,
    (ii) when said control signal is at said second value, directing data received from said peripheral device port to said interface output.

3. An apparatus according to claim 1, wherein said multiplexer maintains electrical connection between said interface input and said interface output until said control signal is at said second value, wherein said multiplexer directs data communication between said second peripheral input device and the computer.

4. An apparatus according to claim 3, wherein said multiplexer re-establishes electrical connection between said interface input and said interface output after said second peripheral input device has completed said data communication with the computer.

5. An apparatus according to claim 2, wherein said multiplexer in said second interface maintains electrical connection between said interface input and said interface output until said signal is at said second value, wherein said multiplexer in said second interface directs data communication between said third peripheral input device and the computer.

6. An apparatus according to claim 5, wherein said multiplexer in said second interface re-establishes electrical connection between said interface input and said interface output after said third peripheral input device has completed said data communication with the computer.

7. An apparatus according to claim 1, wherein said interface further comprises memory, operatively connected to said microprocessor, said microprocessor storing data received from said second peripheral input device in said memory when the computer is communicating with said first peripheral input device, said microprocessor transmitting said data stored in said memory when the computer is available for communicating with said second peripheral input device, thereby avoiding bus contention.

8. An interface according to claim 2, wherein said second interface further comprises memory, operatively connected to said microprocessor, said microprocessor storing data received from said third peripheral input device in said memory when the computer is communicating with said first peripheral input device, said microprocessor transmitting said data stored in said memory when the computer is available for communicating with said third peripheral input device, thereby avoiding bus contention.

9. An apparatus according to claim 2, further comprising:

a conversion circuit for converting data received from said second input peripheral device in a first predetermined format to a second predetermined format, said second format being compatible with the input port of said general purpose computer.

10. An apparatus according to claim 9, further comprising:

a second conversion circuit for converting data received from said third input peripheral device in a third predetermined format to said second predetermined format for communicating with said general purpose computer.

11. An apparatus according to claim 9, wherein said second predetermined format is a standard keyboard format.

12. An apparatus according to claim 10, wherein said second predetermined format is a standard keyboard format.

13. An apparatus according to claim 2, further comprising a plurality of said interfaces operatively connected in a daisy chain configuration to said interface input, wherein said first peripheral input device is operatively connected to an interface input of a last interface of said daisy chain.

14. An apparatus according to claim 7, wherein said memory is located in said microprocessor.

15. An apparatus according to claim 8, wherein said memory is located in said microprocessor.

16. An apparatus according to claim 1, wherein said first peripheral input device is a computer keyboard.

17. An apparatus according to claim 1, wherein said peripheral input devices are selected from the group consisting of a bar code reader, a point-of-sale keyboard, a magnetic stripe reader, an electronic scale and a computer keyboard.

18. An apparatus according to claim 2, wherein said first peripheral input device is a computer keyboard.

19. An apparatus according to claim 2, wherein said peripheral input devices are selected from the group consisting of a bar code reader, a point-of-sale keyboard, a magnetic stripe reader, an electronic scale and a computer keyboard.

* * * * *